W. K. LEWIS.
Apparatus for Desiccating Vegetables.

No. 38,753. Patented June 2, 1863.

Witnesses:

Inventor:

UNITED STATES PATENT OFFICE.

WILLIAM K. LEWIS, OF BOSTON, MASSACHUSETTS.

IMPROVEMENT IN APPARATUS FOR DESICCATING VEGETABLES.

Specification forming part of Letters Patent No. 38,753, dated June 2, 1863.

*To all whom it may concern:*

Be it known that I, WILLIAM K. LEWIS, of Boston, in the county of Suffolk and State of Massachusetts, have invented a new and useful Improvement in Apparatus for the Desiccation of Vegetable and other Substances; and I do hereby declare that the following is a full, clear, and exact description of the same, reference being had to the accompanying drawings forming part of this specification, in which—

Figure 1:
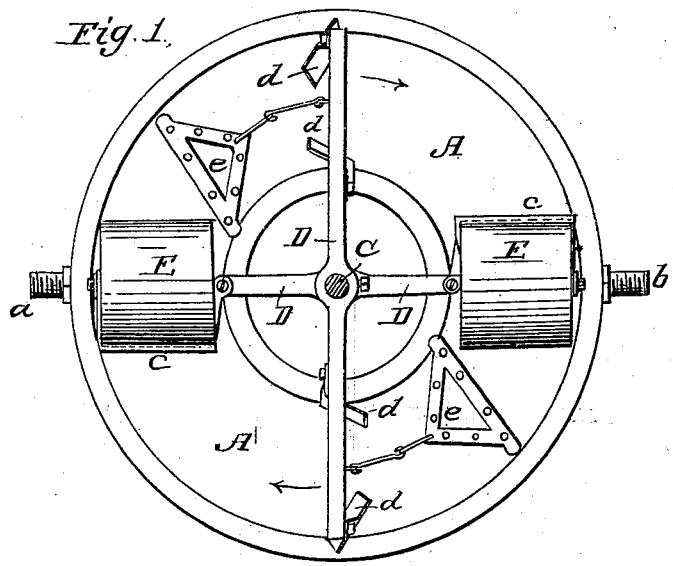
Figure 2:
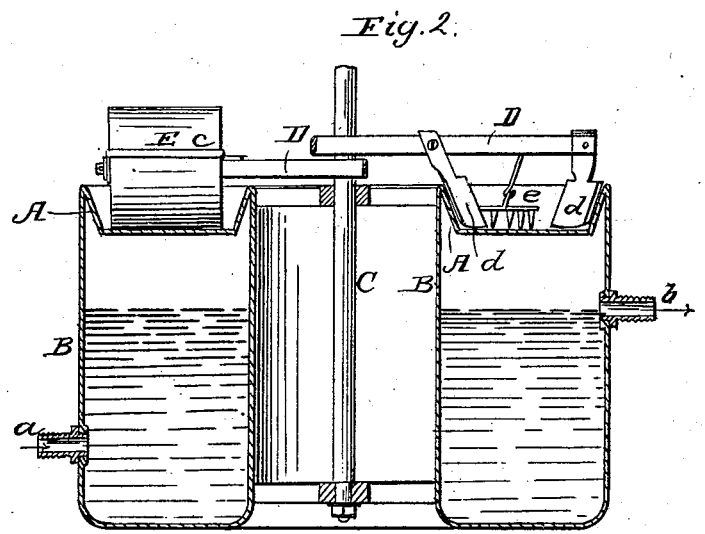

Figure 1 is a plan of an apparatus constructed according to my invention. Fig. 2 is a central vertical section of the same.

Similar letters of reference indicate corresponding parts in both figres.

The object of this invention is to effect the desiccation of fruits, vegetables, meat, fish, and other substances at so low a temperature as not to impair their flavor or nutritious properties; and to this end it consists in the employment in such desiccating process of a pan or vessel of suitable depth to contain such substances, arranged within or over a vessel containing water and heated by the vapor rising from or through said water at a temperature not above the boiling-point, the said water being heated by steam or by the direct application of fire to its containing-vessel and the latter vessel being open to the atmosphere.

It also consists in the employment, in combination with such desiccating-vessel, of rollers for crushing and spreading out, and rakes, scrapers, or stirrers, for stirring up the substances to be desiccated, such rollers and rakes, scrapers, or stirrers being attached to and driven by a rotating shaft arranged in the center of the vessel.

To enable others skilled in the art to make and use my invention, I will proceed to describe it with reference to the drawings.

A is the desiccating-vessel, represented as a shallow metal pan of annular form, and B is the vessel containing the water, of corresponding form and of suitable depth. The vessel A is arranged on the top of the vessel B, so as to form a cover thereto, and the first-mentioned vessel is so formed that its sides as well as its bottom may be exposed to the vapor rising from or through the water, as illustrated in Fig. 2.

$a$ is a pipe connected with the vessel B near its bottom for the introduction of steam thereinto from a boiler, and $b$ is a pipe connected with the said vessel and open to the atmosphere at a distance of about one inch below the bottom of the vessel A, for the overflow of the accumulating water of condensation and for the escape of any excess of steam. The escape thus provided for the steam prevents the heat applied to the bottom of the pan from ever exceeding 212° Fahrenheit.

C is a vertical shaft arranged concentrically to the vessels A and B, and having secured to it above the vessel A any suitable number of arms D D, one or more of which have an axle or axles formed upon it or them for a roller or rollers, E, which are caused to roll on the substance to be desiccated, which is placed in the said vessel, by the revolution of the shaft upon its axis, and another or others of which have attached one or more scrapers, $d$, and rakes $e$, or other stirring devices which are caused by the revolution of the shaft to scrape, rake, or stir up the said substance. The roller or rollers have scrapers $c$ attached to their arms to scrape off from their surfaces any of the substance which may adhere thereto and cause it to be again deposited within the vessel A.

To operate the apparatus, the vessel B is filled with water up to the pipe $b$, and on the admission of steam by the pipe $a$ the water is soon heated, and the vapor rising from its surface and any uncondensed steam passing through it circulates in contact with the bottom and sides of the vessel A, and heats it to a desirable degree, not above the boiling-point of water. The substance to be desiccated is then placed in the vessel A, and rotary motion is given to the shaft C by suitable mechanical means, by which the rollers are caused to roll over, crush, and spread the substance upon the bottom of the pan, and the scrapers and rakes or stirrers are caused to stir up and turn over the substance, and so constantly present new surfaces thereof to the heated surface of the vessel A, and in this way the substance is quickly desiccated without being subjected to a higher temperature than the boiling-point of water. The rollers may be dispensed with for operating on some substances, but it will generally be desirable to use rakes, scrapers, or some equivalent kind of stirrers.

The vessel A may have its bottom flat, as represented, or of corrugated or any other form best calculated to present a surface of desirable character. The vessel B, instead of being heated by the introduction of steam from a boiler, may be placed over a fire and the water contained in it be thereby heated, the pipe $b$ being left open, or a suitable opening to the atmosphere at a desirable distance below the pan A being provided for the escape of any steam that may be generated, and thereby preventing the temperature rising above the boiling-point of water.

What I claim as my invention, and desire to secure by Letters Patent, is—

1. The employment, for the desiccation of vegetable or other substances at a temperature not above the boiling-point of water, of a vessel A, heated by the vapor rising from or through water heated in a vessel, B, which is open to the atmosphere, substantially as herein described.

2. The combination, as herein described, of one or more rollers and one or more rakes, scrapers, or stirrers, with each other and with a desiccating-vessel, A, heated in the manner herein set forth.

WILLIAM K. LEWIS.

Witnesses:
J. W. BAILEY,
JAMES C. ODIORNE.